United States Patent
Jones et al.

(10) Patent No.: US 7,534,057 B2
(45) Date of Patent: May 19, 2009

(54) SURVEILLANCE CAMERA GIMBAL MECHANISM

(75) Inventors: Theodore L Jones, Akron, PA (US); Kathleen E Arnold, York, PA (US)

(73) Assignee: Robert Bosch GmbH, Stuttgart (DE)

( * ) Notice: Subject to any disclaimer, the term of this patent is extended or adjusted under 35 U.S.C. 154(b) by 286 days.

(21) Appl. No.: 11/295,013

(22) Filed: Dec. 6, 2005

(65) Prior Publication Data

US 2007/0127912 A1    Jun. 7, 2007

(51) Int. Cl.
  *G03B 17/00* (2006.01)
(52) U.S. Cl. .................... 396/427; 396/428; 348/151; 348/373; 248/178.1; 248/183.1; 248/187.1
(58) Field of Classification Search ............... 396/428, 396/427, 422, 12; 348/373, 143, 211, 149, 348/144, 145–147; 359/429; 248/586
See application file for complete search history.

(56) References Cited

U.S. PATENT DOCUMENTS

| | | | |
|---|---|---|---|
| 2,973,177 A | 2/1961 | Stubbs | |
| 3,018,082 A | 1/1962 | Berger | |
| 3,388,247 A | 6/1968 | Rackley | |
| 3,712,571 A | 1/1973 | Miller et al. | |
| 3,732,368 A | 5/1973 | Mahlab | |
| 4,048,491 A | 9/1977 | Wessman | |
| 4,341,452 A | 7/1982 | Korling | |
| 4,572,612 A | 2/1986 | Schlapp et al. | |
| 4,653,709 A | 3/1987 | Paldino | |
| 4,959,671 A * | 9/1990 | Ishikawa | 396/428 |
| 5,028,997 A | 7/1991 | Elberbaum | |
| 5,318,257 A | 6/1994 | Tani | |
| 5,327,292 A | 7/1994 | Eguchi | |
| 5,394,209 A | 2/1995 | Stiepel et al. | |
| 5,404,182 A * | 4/1995 | Nomura | 348/836 |
| 5,598,207 A | 1/1997 | Kormos et al. | |
| 5,627,616 A * | 5/1997 | Sergeant et al. | 396/427 |
| 5,794,081 A * | 8/1998 | Itoh et al. | 396/55 |
| 5,870,642 A * | 2/1999 | Mittelstaedt et al. | 396/428 |
| 5,905,923 A | 5/1999 | Chitsaz et al. | |
| 5,964,523 A | 10/1999 | Eversberg | |
| 5,967,640 A | 10/1999 | Moriyama et al. | |

(Continued)

FOREIGN PATENT DOCUMENTS

EP    0810791 A2    12/1997

(Continued)

OTHER PUBLICATIONS

Aerotech in Motion, Optical Mounts and Gimbals Brochure, Apr. 1, 2005.*

(Continued)

*Primary Examiner*—Melissa J Koval
*Assistant Examiner*—Linda B Smith
(74) *Attorney, Agent, or Firm*—Baker & Daniels LLP

(57) ABSTRACT

A surveillance camera gimbal mechanism. The mechanism utilizes a rotationally adjustable disk and support arrangement to afford smoothly adjustable, fastener-free, and stable diagonal adjustment that also provides axial compliance. The diagonal adjustment mechanism is integrated with a pan and tilt gimbal mechanism to allow smooth and stable single-point manual fixation of pan and tilt positions without creating depressions in the mating parts which make readjustment difficult.

30 Claims, 9 Drawing Sheets

U.S. PATENT DOCUMENTS

| | | | |
|---|---|---|---|
| 6,095,660 A | 8/2000 | Moriyama et al. | |
| 6,124,892 A * | 9/2000 | Nakano | 348/373 |
| 6,234,691 B1 | 5/2001 | Jones et al. | |
| 6,268,882 B1 | 7/2001 | Elberbaum | |
| 6,375,369 B1 | 4/2002 | Schneider et al. | |
| 6,392,799 B1 * | 5/2002 | Baun et al. | 359/430 |
| 6,715,940 B2 | 4/2004 | Top et al. | |
| 6,752,520 B2 | 6/2004 | Vernusset et al. | |
| 6,808,136 B2 * | 10/2004 | Sneeringer et al. | 241/172 |
| 7,104,863 B2 * | 9/2006 | Mimlitch et al. | 446/94 |
| 7,298,969 B2 * | 11/2007 | Elberbaum | 396/28 |
| 2002/0044214 A1 | 4/2002 | Hovanky | |
| 2002/0130230 A1 | 9/2002 | Ursan et al. | |
| 2003/0103161 A1 | 6/2003 | Tatewaki et al. | |
| 2006/0239677 A1 | 10/2006 | Friedrich | |

FOREIGN PATENT DOCUMENTS

| | | |
|---|---|---|
| EP | 1380793 A2 | 1/2004 |
| JP | 2005184432 A | 7/2005 |
| JP | 2006222610 A | 8/2007 |
| WO | WO 99/66472 A1 | 12/1999 |

OTHER PUBLICATIONS

Aerotech Corporation Selection Guide, AOM130 Model, Jun. 10, 2004.*

Aerotech Press Release—Optical Mounts and Gimbal, Oct. 2005.*

Search and Examination Report from Corresponding British Application Serial No. GB 062 4317.4.

* cited by examiner

SURVEILLANCE CAMERA GIMBAL MECHANISM

BACKGROUND OF THE INVENTION

1. Field of the Invention

The present invention relates to surveillance camera systems, and, more particularly, to a surveillance camera gimbal mechanism.

2. Description of the Related Art

A typical external camera adjustment mechanism may move the entire housing subassembly of a camera, and thus, the viewing direction of the camera is more easily discerned by the observer. Thus, a person under surveillance is able to take evasive action to avoid being viewed by the camera. A typical implementation of an external mechanism is a manually-adjusted mount that is fixed at the time of installation and then maintains the same camera position during operation. External adjustment mechanisms that operate under remote control can be used to allow continuous repositioning of the camera during operation, but still may be avoided by a person under surveillance. Typical pan-tilt adjustment mechanisms require a larger operating envelope because the tilt axis is offset from the center of the camera housing, and thus has a larger operating range of movement.

A hemispherical window may be used to contain the external adjustment mechanism. In this configuration, the adjustment mechanism is contained inside the housing such that the housing does not move relative to the surrounding objects under surveillance. A position of the camera is out of easy view of the person under surveillance, especially if an opaque, hemispherical, and covert liner is placed inside the hemispherical window to obscure most views of the camera and mask its silhouette within the hemispherical window.

In early designs, the camera was positioned inside the hemispherical window on a mechanism similar to that described above where the tilt axis offset necessitated that the hemisphere diameter was large to accommodate a full range of motion. Subsequent improvements in the mechanism using a yoke-type mechanism to position the tilt axis more toward the center of the camera allowed for a smaller operating envelope, which has resulted in much smaller and less obtrusive hemispherical window housings.

However, typical adjustment mechanisms force an installer to manipulate and tighten multiple fasteners for the tilt, pan, and diagonal adjustments. Furthermore, fasteners located on a rotational axis must be tightened very tight to be stable. Additionally, lock washers used with the on-axis fasteners may develop depressions in the mating parts that favor certain angular positions, thereby making it more difficult for the installer to set a new angular position. Finally, the diagonal adjustment range is limited by the structural topography of typical adjustment slots used for diagonal adjustment.

Furthermore, typical prior art cameras do not include a compliant element to allow lens displacement if an external impact deflects the hemispherical window, especially when the impact is applied to the apex of the hemisphere.

What is needed in the art is a surveillance camera gimbal mechanism which provides an improved adjustment mechanism.

SUMMARY OF THE INVENTION

The present invention provides a surveillance camera gimbal mechanism to position a camera inside a hemispherical window housing where the camera position within the housing is manually adjusted at installation and then fixed during subsequent operation. The present invention utilizes a rotationally adjustable disk and support arrangement to afford smoothly adjustable, fastener-free, and stable diagonal adjustment that also provides axial compliance to allow a camera lens of the camera to be displaced away from the hemispherical window when the window undergoes deformation due to external impact. The space-efficient diagonal adjustment of the camera around a lens optical axis of the camera is valuable in many applications to square-up the camera relative to an object, such as a door or card table, or in situations where the camera housing is mounted at an angle, such as in a sloped ceiling or stairwell. The diagonal adjustment mechanism is integrated with a pan and tilt gimbal mechanism to allow smooth and stable single-point manual fixation of pan and tilt positions without creating depressions in the mating parts which make readjustment difficult, all in the larger context of a modular camera head that can be blind-mate connected into the camera housing.

The invention comprises, in one form thereof, a surveillance camera for providing control of a camera lens assembly having a lens optical axis, including a support structure; a diagonal adjustment mechanism mounted in the support structure, the diagonal adjustment mechanism selectively rotatable relative to the support structure; and a tilt adjustment mechanism mounted in the support structure and including a single only tilt fastener.

The invention comprises, in another form thereof, a surveillance camera for providing control of a camera lens assembly having a lens optical axis, including a support structure; a diagonal adjustment mechanism mounted in the support structure, the diagonal adjustment mechanism selectively rotatable relative to the support structure; and a pan adjustment mechanism associated with the support structure including a single only pan fastener.

The invention comprises, in yet another form thereof, a surveillance camera for providing control of a camera lens assembly having a lens optical axis, including a support structure; a diagonal adjustment mechanism mounted in the support structure, the diagonal adjustment mechanism selectively rotatable relative to the support structure; a tilt adjustment mechanism mounted in the support structure and including a single only tilt fastener; and a pan adjustment mechanism associated with the support structure including a single only pan fastener.

An advantage of the present invention is that the diagonal adjustment mechanism is smoothly adjustable, fastener-free, and stable.

Another advantage is that the pan and tilt mechanisms allow stable, single-point manual fixation of pan and tilt positions without creating depressions in the mating parts.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
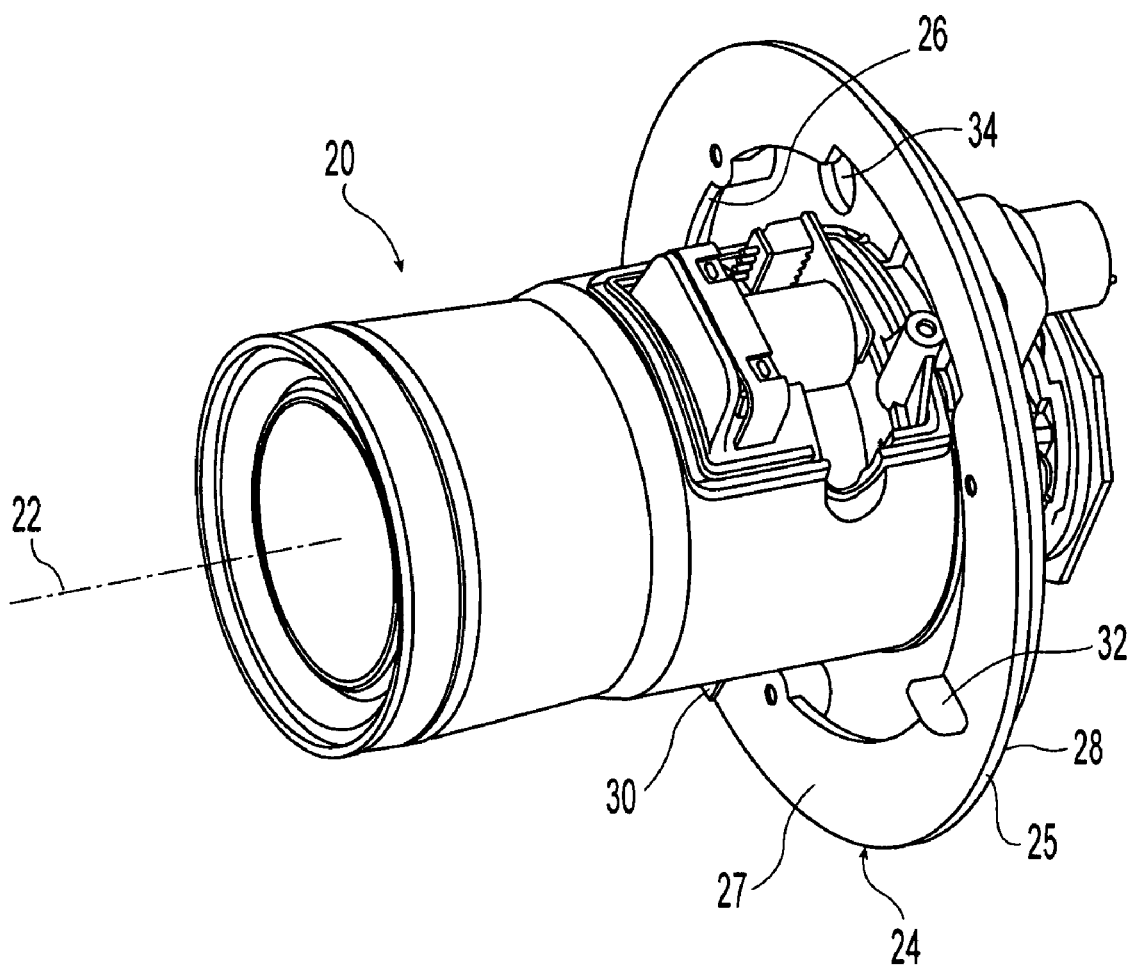
FIG. 1 is a perspective view of a camera lens assembly.

Corresponding reference characters indicate corresponding parts throughout the several views. Although the exemplifications set out herein illustrate the invention, in one form, the embodiments disclosed below are not intended to be exhaustive or to be construed as limiting the scope of the invention to the precise form disclosed.

DESCRIPTION OF THE PRESENT INVENTION

Referring now to the drawings, and particularly to FIG. 1, camera lens assembly 20 is shown including lens optical axis 22. Disk-shaped mounting ring 24 is attached to camera lens assembly 20 such that the center of mounting ring 24 coincides with lens optical axis 22 and mounting ring 24 has a defined thickness measured in the direction of lens optical axis 22. Mounting ring 24 includes front surface 27 from which protrusions 30 and 32 protrude. Mounting ring 24 also includes an inner surface 26 diametrically inside of which is aperture 34 to permit passage of electrical wires from camera assembly 20 to a power source. Mounting ring 24 further includes back surface 28 defining a thickness between front surface 27 and back surface 28, as well as outer surface 25 defining an outside diameter of mounting ring 24.

Figure 2:
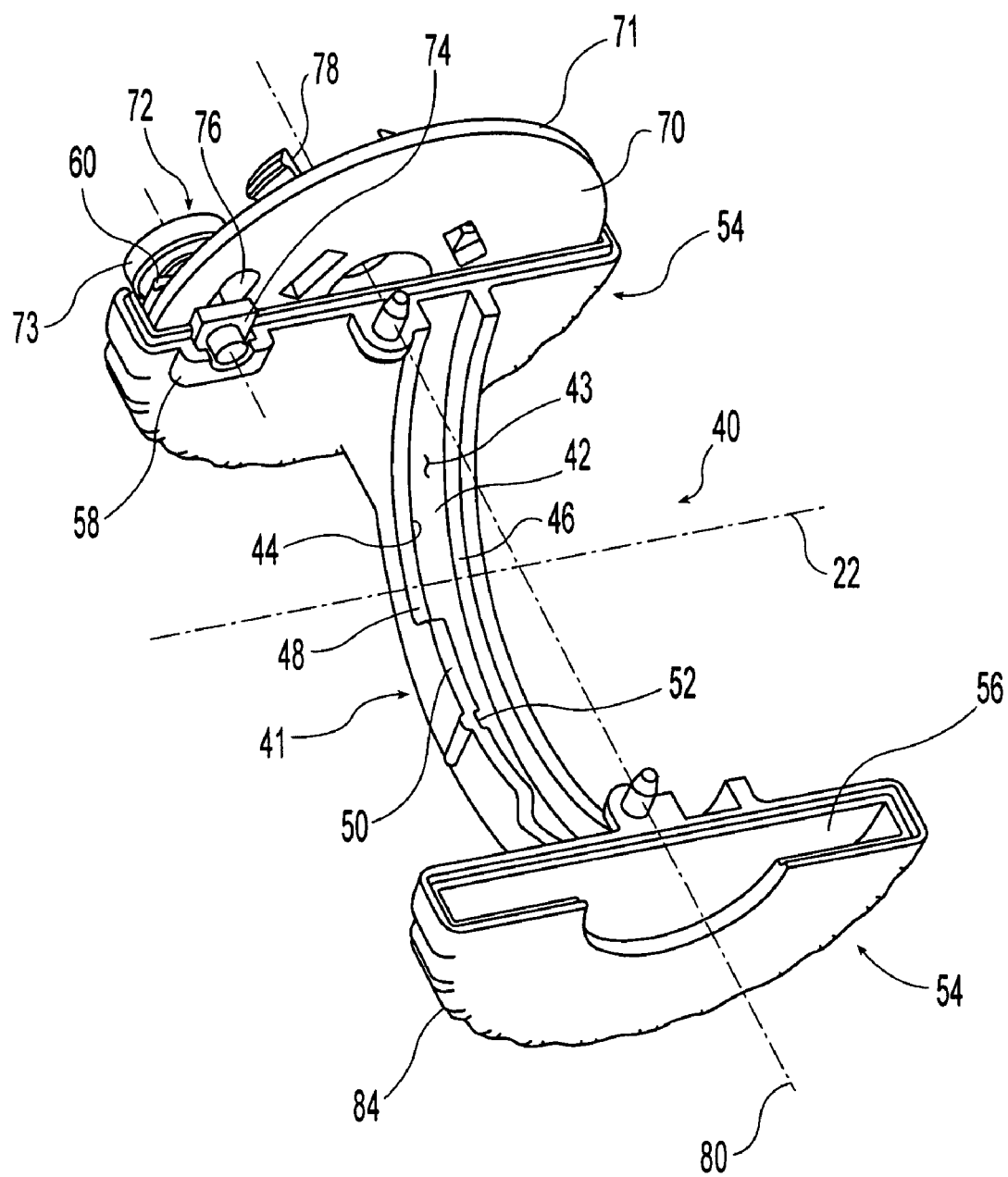
FIG. 2 is a partial perspective view of a portion of a support structure for an adjustment mechanism for the camera lens assembly of FIG. 1.
Figure 3:
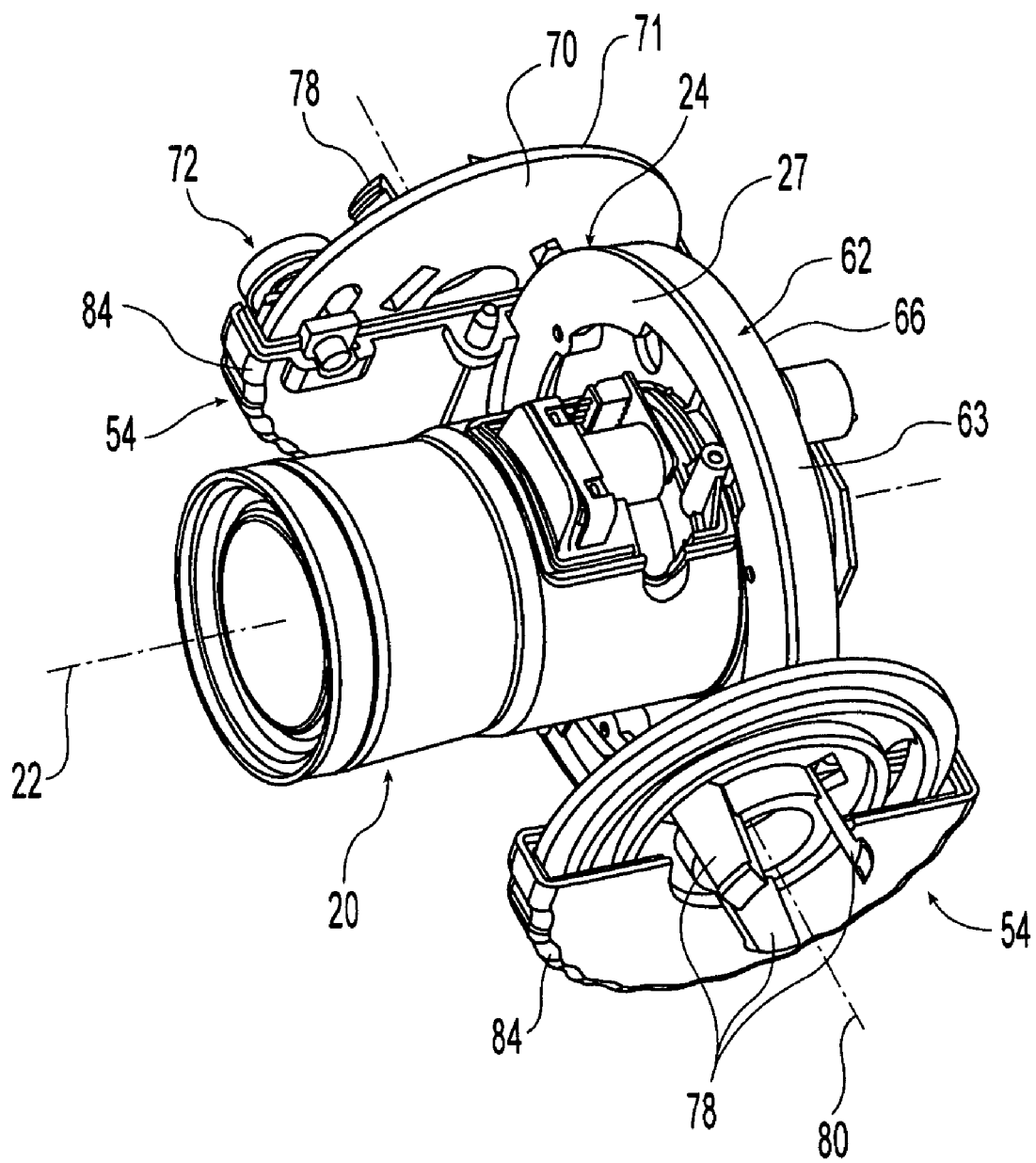
FIG. 3 is a partial perspective view of the camera lens assembly of FIG. 1, further illustrating the support structure of FIG. 2 and a washer disposed therein.
Figure 4:
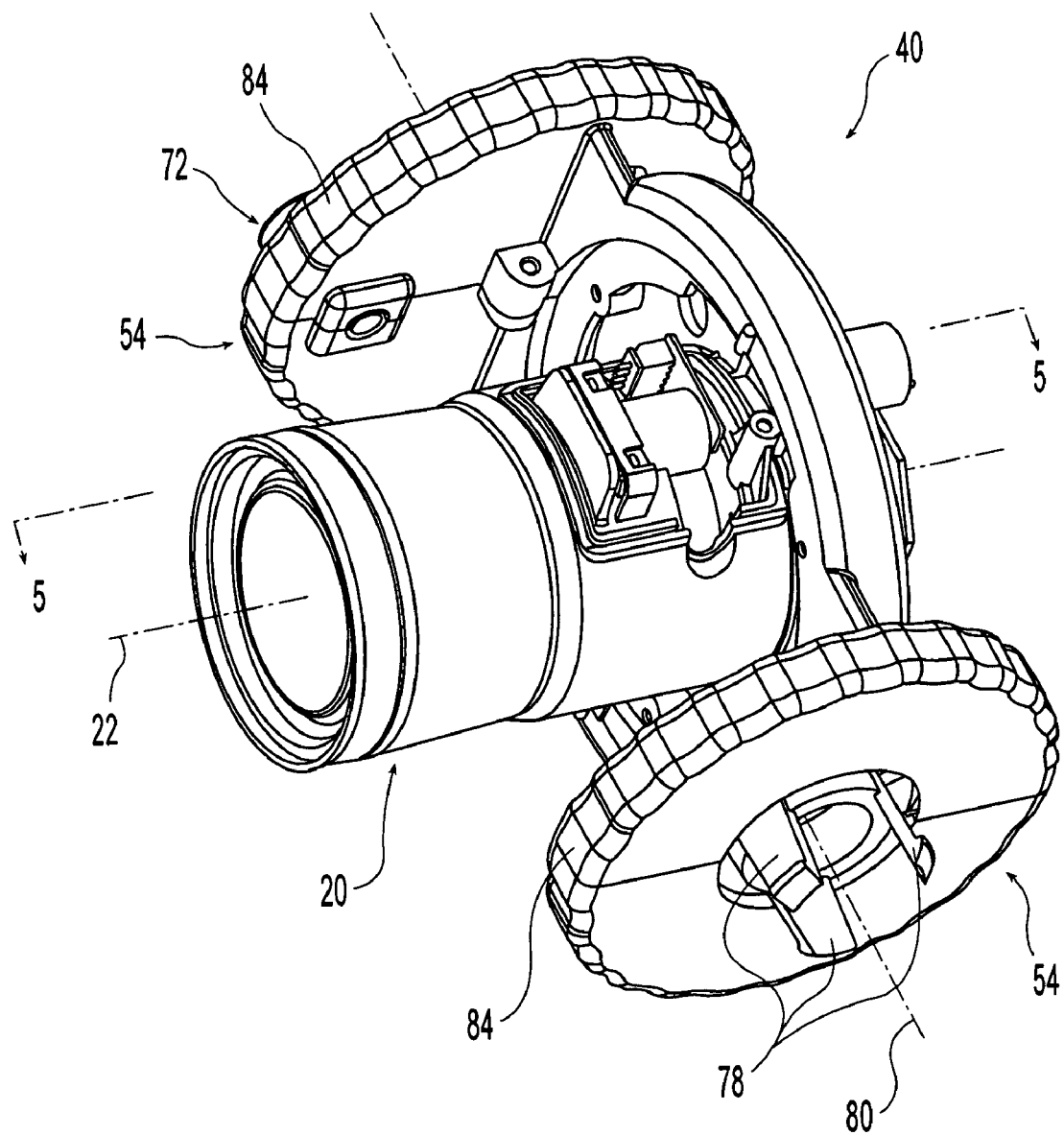
FIG. 4 is a perspective view of the support structure and camera lens assembly.

Referring to FIGS. 2 and 3, support structure 40 is shown including central portion 41 having internal groove 42 with a defined radial depth that captures mounting ring 24 therein (FIG. 3). Central portion 41 is generally cylindrical and has a centerline which coincides with lens optical axis 22. Groove 42 includes front surface 44 and back surface 46 with bottom surface 43 connecting front and back surfaces 44 and 46. Outer surface 25 of mounting ring 24 is disposed in touching engagement with bottom surface 43 of groove 42. Mounting ring 24 is captured in groove 42 with front surface 44 and back surface 46 of groove 42. Surfaces 44 and 46 are substantially perpendicular to lens optical axis 22 to thereby prevent substantial movement of camera lens assembly 20 relative to support structure 40 along the direction of lens optical axis 22, except as allowed by a slight difference between the thickness of mounting ring 24 and the greater width of groove 42 between front surface 44 and back surface 46.

Figure 5:
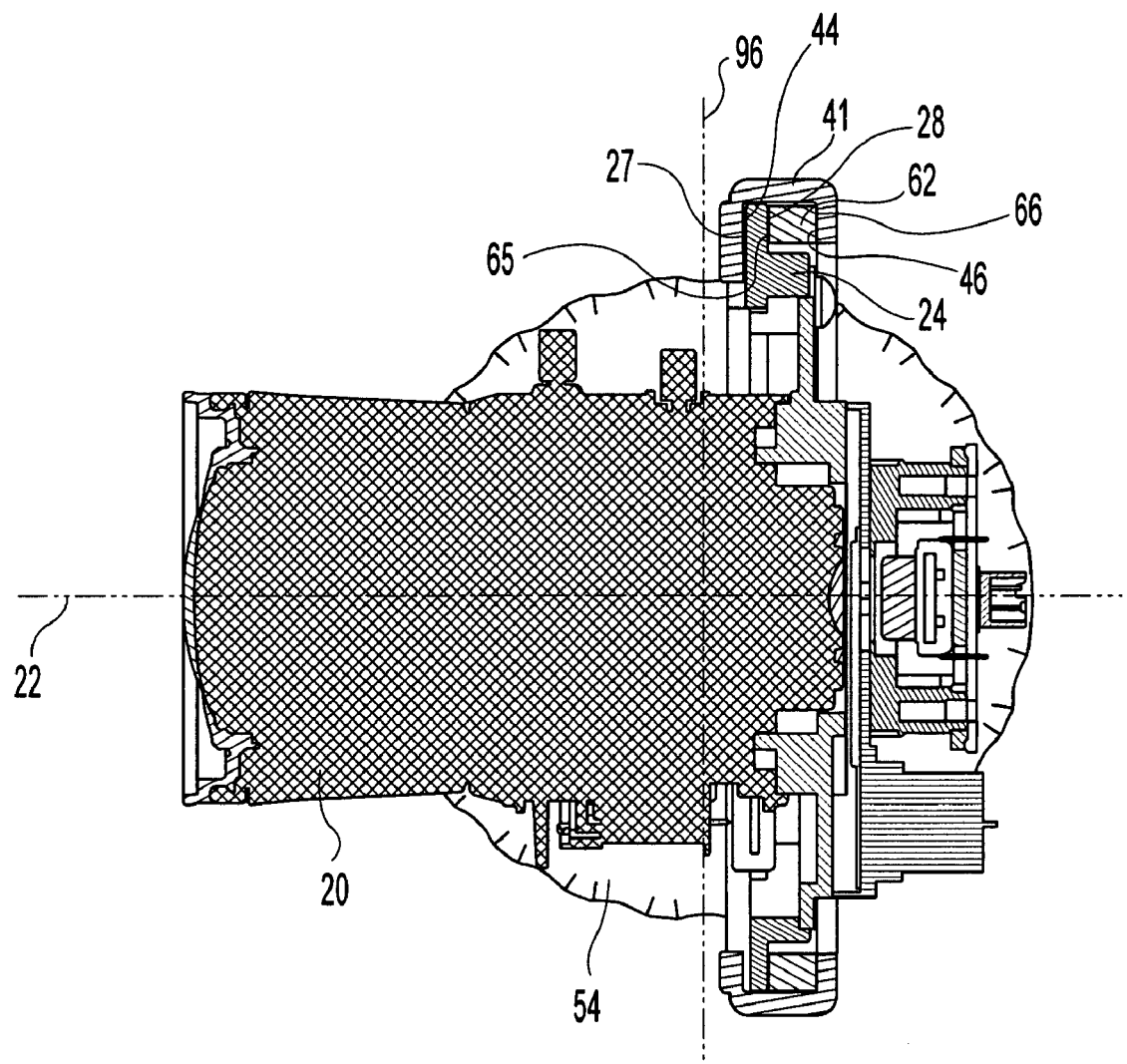
FIG. 5 is a cross-sectional view of the support structure and camera lens assembly of FIG. 4, taken along line 5-5 in FIG. 4.

The slight difference between the thickness of mounting ring 24 and the width of groove 42 allows washer 62 to be inserted therein. The thickness of washer 62 may vary when compression force is applied along the direction of lens optical axis 22. Washer 62 includes front surface 65 (FIG. 5) and back surface 66. When inserted in groove 42, front surface 65 contacts back surface 28 of mounting ring 24 and back surface 66 contacts back surface 46 of groove 42. Upon the application of a compressive force, washer 62 compresses and allows mounting ring 24 to slightly axially move toward back surface 46 of groove 42. By doing so, camera lens assembly 20 may absorb the compressive force without damaging any components therein. Washer 62 also includes outer surface 63 and an inner surface which define a radial width of washer 62 which is approximately equal to the radial depth of groove 42.

Referring again to FIG. 2, and to provide diagonal adjustment of camera lens assembly 20, protrusion 30 on front surface 27 of mounting ring 24 rides against front surface 44 of groove 42 as camera lens assembly 20 and mounting ring 24 are rotated relative to support structure 40. Protrusion 30 snaps into one of a plurality of corresponding recesses 52 in front surface 44 of groove 42 due to pressure from compressed washer 62 disposed between mounting ring 24 and back surface 46 of groove 42. Recesses 52, only one of which is shown in FIG. 2, are spaced around central portion 41 of support structure 40 at significant angular orientations.

Additionally, protrusion 32 extends from front surface 27 at a radial distance from lens optical axis 22 less than inner surface 48 of central portion 41. A localized radial protrusion 50 extends radially inward from inner surface 48 of central portion 41 and interferes with protrusion 32 for a small portion of the 360° relative rotation of mounting ring 24 in central portion 41 such that the two parts cannot be continuously rotated relative to one another, thereby preventing complete 360° rotation of mounting ring 24 in support structure 40.

In operation, a user applies compressive force to washer 62 along the direction of lens optical axis 22 to thereby slightly compress washer 62 and move protrusion 30 out of engagement with a recess 52. The user may then rotate mounting ring 24/camera lens assembly 20, subject to the restrictions of protrusion 32 with protrusion 50, until a desired diagonal adjustment is achieved. The user then releases the compressive force and, if a recess 52 is aligned with protrusion 30, the compressed washer 62 forces protrusion 30 into engagement with recess 52 and diagonally locks camera lens assembly 20 with respect to support structure 40. If recess 52 is misaligned with protrusion 30, the user may need to slightly rotate camera lens assembly 20 until protrusion 30 snaps into recess 52. Alternatively, if an additional diagonal adjustment is desired, recess 52 may remain misaligned with protrusion 30 and washer 62 will maintain sufficient pressure to hold stable mounting ring 24 because of friction around the entire perimeter of mounting ring 24 with washer 62. The relatively large diameter of washer 62 results in more contact area with mounting ring 24 to resist movement relative to lens optical axis 22.

To move camera lens assembly 20 in a tilting and/or panning manner, a tilt adjustment mechanism and a pan adjustment mechanism are provided. The tilt adjustment mechanism and the pan adjustment mechanism each provide a single fixation fastener to provide smooth and stable single-point manual fixation of pan and tilt positions of camera lens assembly 20 without creating permanent depressions in the mating parts which make readjustment difficult.

Figure 6:
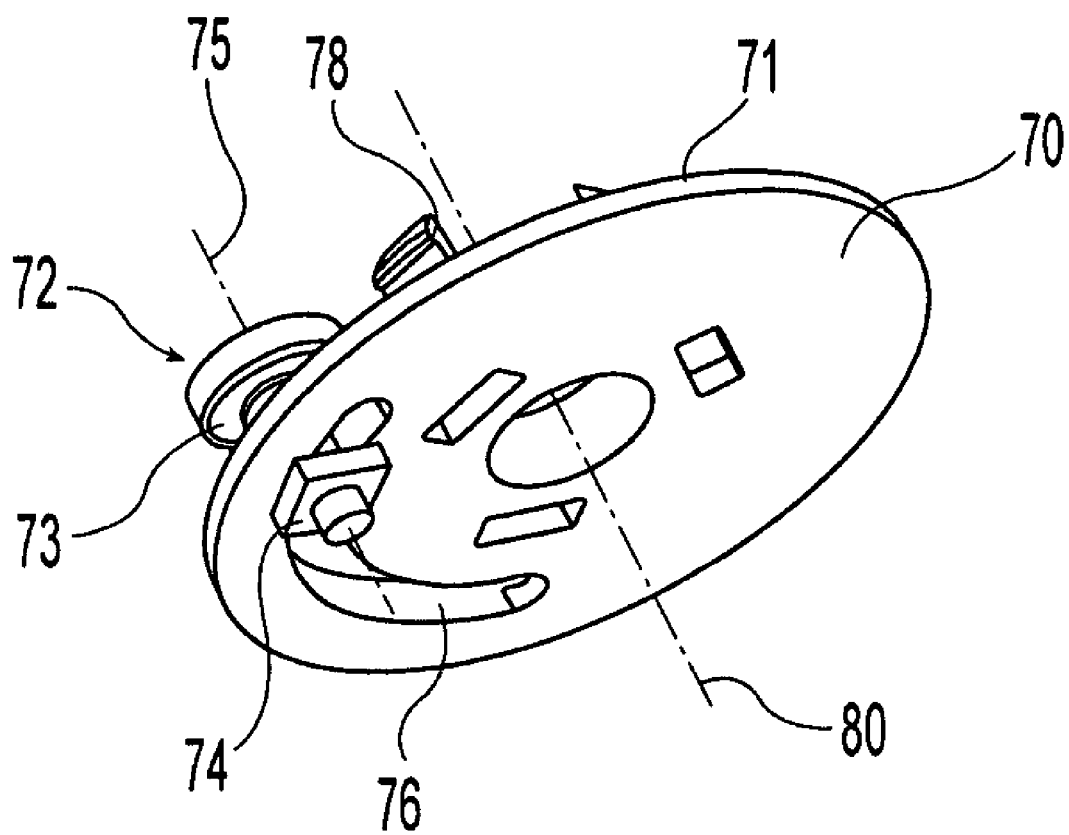
FIG. 6 is a perspective view of a tilt disk of the adjustment mechanism.
Figure 7:
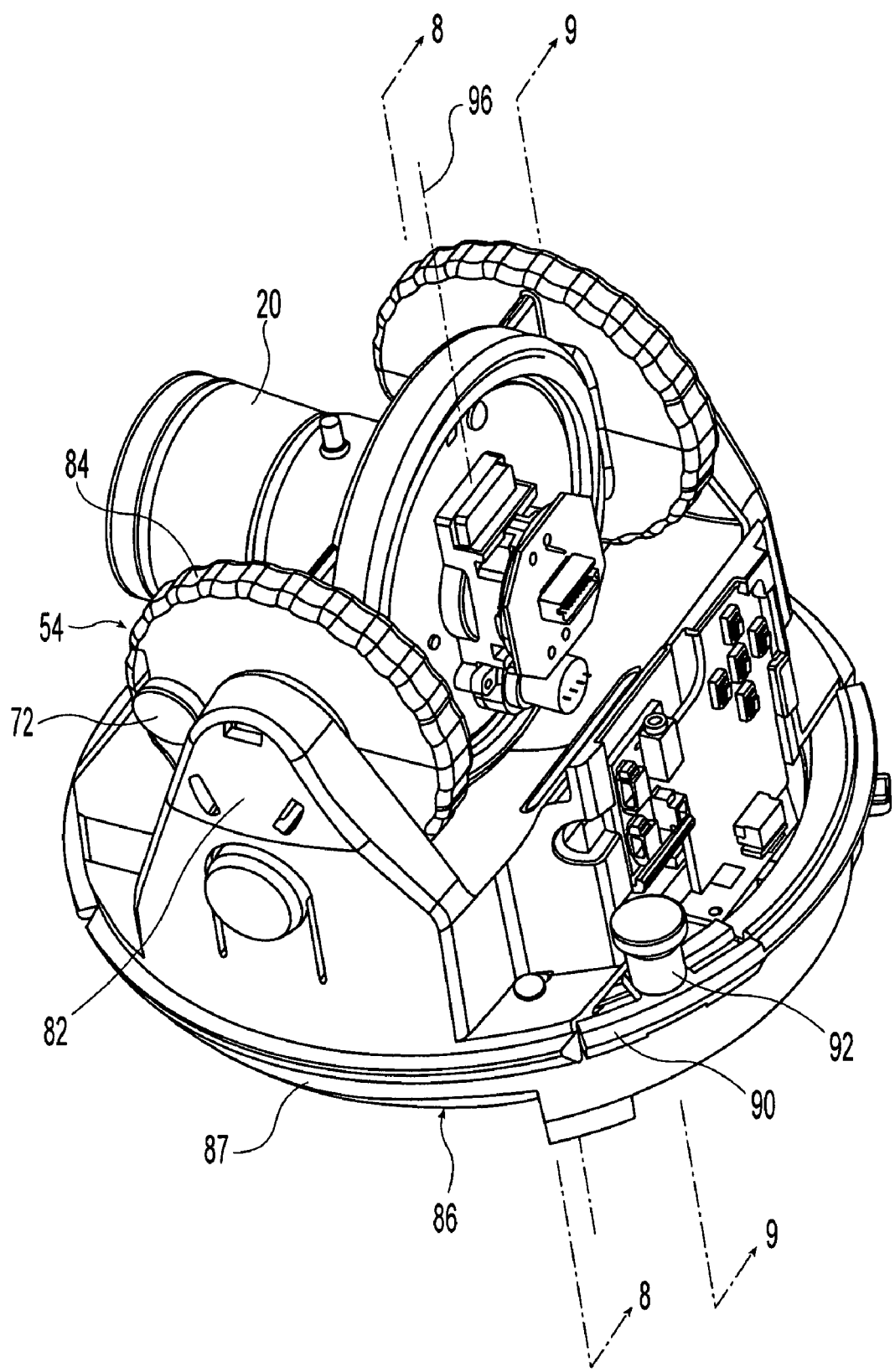
FIG. 7 is a perspective view of the adjustment mechanism, further illustrating a tilt and a pan adjustment mechanism.

The tilt adjustment mechanism, shown in FIGS. 6-7, includes tilt fastener 72 and tilt disk 70. Tilt disk 70 includes arcuately-shaped tilt disk adjustment slot 76. Tilt disk 70 further includes outer surface 71 defining an outside diameter of tilt disk 70. Slot 76 remains substantially the same distance from tilt axis 80 throughout its entire length. Tilt fastener axis 75 of tilt fastener 72 is positioned at a distance away from tilt axis 80 to increase the torque and therefore long-term stability of the tilt fixation provided by tilt fastener 72.

Referring to FIGS. 2 and 6, support structure 40 includes two end portions 54 each with pocket 56 disposed therein to accept tilt disk 70. Tilt axis 80 is coaxial with the center point of each end portion 54. At least one end portion 54 includes tilt fastener opening 60 and tilt fastener pocket 58 positioned on opposing sides of end portion 54 at the same distance from tilt axis 80 as tilt disk adjustment slot 76 is positioned from tilt axis 80. Tilt fastener 72 includes, in one embodiment, bolt or thumbscrew 73 and nut 74. Thumbscrew 73 traverses tilt fastener opening 60, tilt disk adjustment slot 76, and tilt fastener pocket 58 after which nut 74 is threaded onto bolt 73 near tilt fastener pocket 58. Tilt fastener 72 components may be made of strong material such as steel to prevent thread damage during overtightening. Thumbscrew 73 clamps against end portion 54 in tilt fastener opening 60 to prevent thumbscrew 73 from exerting a concentrated pressure that may form discrete angular depressions in tilt disk 70 that would favor certain angular positions and make readjustment difficult. Similarly, nut 74 is substantially larger than the opening of slot 76 but still fits within tilt fastener pocket 58 to distribute the pressure exerted by tightening fastener 72 over a greater area and prevent the formation of discrete angular depressions in tilt disk 70.

Figure 8:
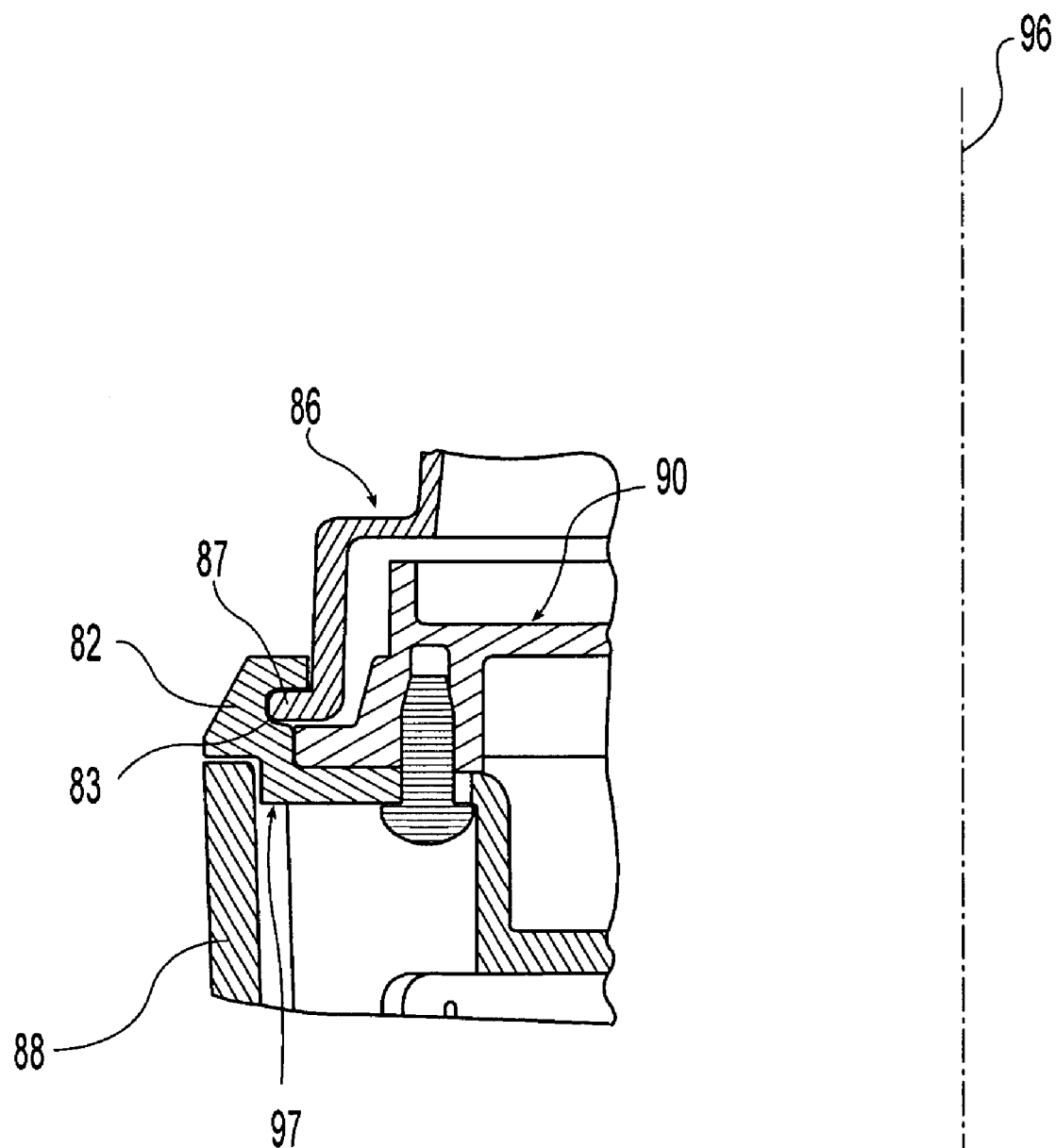
FIG. 8 is a cross-sectional view of a portion of the pan adjustment mechanism of FIG. 7, taken along line 8-8 of FIG. 7.
Figure 9:
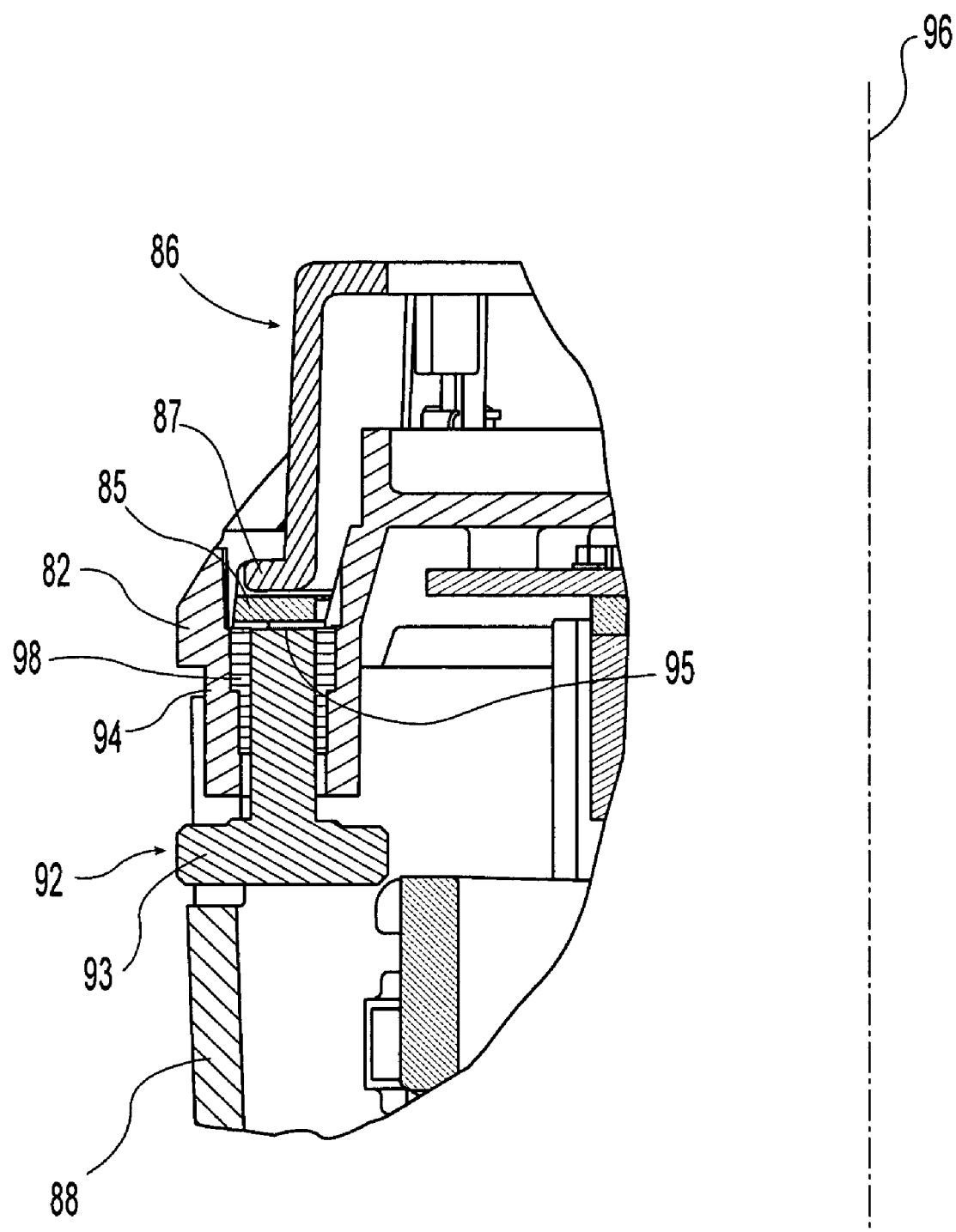
FIG. 9 is a cross-sectional view of a portion of the pan adjustment mechanism of FIG. 7, taken along line 9-9 of FIG. 7.

Referring again to FIGS. 6 and 7, the tilt adjustment mechanism also includes tilt support 82 which is structurally attached to tilt disk 70 at tilt axis 80 to allow a significant portion of tilt disk 70 to extend beyond tilt support 82, thus providing easy external access to outer tilt grip surface 84 and tilt fastener 72. Tilt disk mounting structure 78 may be provided on tilt disk 70 to permit mounting to tilt support 82 and to allow orientation of tilt disk adjustment slot 76 relative to tilt support 82 while preventing rotation of tilt disk 70 relative to tilt support 82. As shown in FIGS. 7 and 8, tilt support 82 includes an internal groove 83 to substantially match outer-facing base rim 87 of camera head base 86. Camera head base 86 may be substantially similar to that fully disclosed and described in U.S. Pat. No. 7,217,045 entitled "CONNECT/DISCONNECT MECHANISM FOR A SURVEILLANCE CAMERA HEAD", assigned to the assignee of the present application, the disclosure of which is hereby expressly incorporated herein by reference.

Referring now to FIGS. 5 and 7-9, the pan adjustment mechanism includes pan fastener 92 and pan plate 90. Pan fastener 92 is positioned a distance away from pan axis 96 to increase the torque and therefore long-term stability of the pan fixation. Pan fastener 92 may be made of strong material such as steel to prevent thread damage during overtightening of pan fastener 92 into pan plate fastener boss 94. Pan plate 90 is attached to tilt support 82 to capture base rim 87 such that the subassembly including pan plate 90 and tilt supports 82 can rotate relative to camera head base 86 without disengaging from camera head base 86.

Pan plate fastener boss 94 accepts pan fastener 92 in a direction parallel to pan axis 96 such that head 93 of pan fastener 92 may be used to clamp pan plate 90 against base rim 87 to thereby prevent panning movement. Tilt support tongue 85 is interposed between end 95 of pan fastener 92 and base rim 87 to prevent end 95 of pan fastener 92 from creating a permanent localized deformation on base rim 87 that may compromise further adjustment of the pan adjustment mechanism.

Pan plate fastener boss 94 may include threaded insert 98 which is inserted into pan plate fastener boss 94 to prevent pan fastener 92 from stripping the threads in pan plate 90 during tightening of pan fastener 92 against tilt support tongue 85. Pan plate 90 includes pan plate step 97 to accept the edge of covert liner 88 to make covert liner 88 more secure in the event of external forces being applied to the hemispherical window.

The adjustment mechanisms described herein may be combined with a camera system including connect and disconnect features, such as those described in U.S. Pat. No. 7,217,045 entitled "CONNECT/DISCONNECT MECHANISM FOR A SURVEILLANCE CAMERA HEAD", assigned to the assignee of the present application, the disclosure of which is expressly incorporated herein by reference, to produce a modular, fixed camera head that is easily interchangeable in the field with a remote-controlled pan-tilt camera head.

While this invention has been described as having an exemplary design, the present invention may be further modified within the spirit and scope of this disclosure. This application is therefore intended to cover any variations, uses, or adaptations of the invention using its general principles.

What is claimed is:

1. A surveillance camera gimbal mechanism for providing control of a camera lens assembly having a lens optical axis, comprising:
    a support structure;
    a diagonal adjustment mechanism mounted in said support structure, said diagonal adjustment mechanism being secured in said support structure by a compressible structure and selectively rotatable relative to said support structure when a compressive force is applied to the compressible structure in a direction generally parallel to the lens optical axis; and
    a tilt adjustment mechanism mounted in said support structure and including a single only tilt fastener.

2. The gimbal mechanism of claim 1, further comprising a pan adjustment mechanism associated with said support structure including a single only pan fastener.

3. The gimbal mechanism of claim 1, wherein said support structure comprises a central body portion including a groove having at least one recess, at least one protrusion extending radially inwardly, and at least one end body portion.

4. A gimbal mechanism of claim 1, wherein said diagonal adjustment mechanism comprises a ring attached to the camera lens assembly and disposed in a groove of the support structure, said ring including at least one protrusion extending therefrom parallel to the lens optical axis.

5. The gimbal mechanism of claim 4, wherein a center of said ring coincides with the lens optical axis.

6. The gimbal mechanism of claim 5, wherein said ring has a thickness measured in the direction of the lens optical axis which is less than a thickness of said groove.

7. The gimbal mechanism of claim 6, wherein the compressible structure is disposed adjacent said ring within said groove.

8. The gimbal mechanism of claim 1, wherein said tilt adjustment mechanism includes a tilt axis about which the camera lens assembly is tilted, said tilt fastener offset from said tilt axis.

9. The gimbal mechanism of claim 1, wherein said tilt adjustment mechanism includes a tilt disk, said tilt disk including an arcuately-shaped slot, said tilt fastener extending through said tilt disk via said slot.

10. The gimbal mechanism of claim 1, wherein said tilt fastener comprises two parts, wherein at least one part contacts said support structure, whereby contact with said support structure prevents said tilt fastener from contacting said tilt disk.

11. The gimbal mechanism of claim 10, wherein said support structure includes at least one throughbore, said at least one throughbore shaped to receive said one part of said tilt fastener.

12. The gimbal mechanism of claim 1, wherein said tilt fastener includes means for avoiding localized deformations formed in said tilt adjustment mechanism.

13. A surveillance camera gimbal mechanism for providing control of a camera lens assembly having a lens optical axis, comprising:
- a support structure;
- a diagonal adjustment mechanism mounted in said support structure, said diagonal adjustment mechanism being secured in said support structure by a compressible structure and selectively rotatable relative to said support structure when a compressive force is applied to the compressible structure in a direction generally parallel to the lens optical axis.

14. The gimbal mechanism of claim 13, further comprising a tilt adjustment mechanism mounted in said support structure and including a single only tilt fastener.

15. The gimbal mechanism of claim 13, wherein said support structure comprises a central body portion including a groove having at least one recess, at least one protrusion extending radially inwardly, and at least one end body portion.

16. The gimbal mechanism of claim 13, wherein said diagonal adjustment mechanism comprises a ring attached to the camera lens assembly and disposed in a groove of the support structure, said ring including at least one protrusion extending therefrom parallel to the lens optical axis.

17. The gimbal mechanism of claim 16, wherein a center of said ring coincides with the lens optical axis.

18. The gimbal mechanism of claim 17, wherein said ring has a thickness measured in the direction of the lens optical axis which is less than a thickness of said groove.

19. The gimbal mechanism of claim 18, wherein the compressible structure is disposed adjacent said ring within said groove.

20. A surveillance camera gimbal mechanism for providing control of a camera lens assembly having a lens optical axis, comprising:
- a support structure;
- a diagonal adjustment mechanism mounted in said support structure, said diagonal adjustment mechanism being secured in said support structure by a compressible structure and selectively rotatable relative to said support structure when a compressive force is applied to the compressible structure in a direction generally parallel to the lens optical axis;
- a tilt adjustment mechanism mounted in said support structure and including a single only tilt fastener; and
- a pan adjustment mechanism associated with said support structure including a single only pan fastener.

21. The gimbal mechanism of claim 13, wherein the compressible structure is a washer having a thickness which varies when compression force is applied in a direction parallel to the lens optical axis.

22. The gimbal mechanism of claim 21, wherein the washer includes a front surface configured to contact a back surface of the ring and a back surface configured to contact a back surface of the groove when the washer is located in the groove.

23. The gimbal mechanism of claim 21, wherein application of the compressive force compresses the washer and allows the ring to move axially toward the back surface of the groove and rotate relative to the support structure.

24. The gimbal mechanism of claim 4, further comprising at least one protrusion formed on a front surface of the ring, the at least one protrusion riding against a front surface of the groove as camera lens assembly and the ring are rotated relative to support structure, the at least one protrusion entering one of a plurality of recesses formed in a front surface of the groove due to pressure from the compressible structure to lock the camera lens assembly and the ring in a fixed position relative to the support structure.

25. The gimbal mechanism of claim 24, wherein application of the compressive force to the compressible structure in a direction parallel to the lens optical axis compresses the compressible structure and moves the at least one protrusion out of engagement with the recess to permit rotation of the ring and the camera lens assembly relative to the support structure.

26. The gimbal mechanism of claim 4, further comprising a radial protrusion formed on the ring, the radial protrusion being configured to engage a portion of the support structure to prevent complete 360° rotation of the ring relative to the support structure.

27. The gimbal mechanism of claim 13, further comprising a pan adjustment mechanism associated with said support structure including a single only pan fastener.

28. The gimbal mechanism of claim 1, wherein the compressible structure applies a force to the diagonal adjustment mechanism in a direction generally parallel to the lens optical axis, thereby providing a friction, force to resist rotation of the diagonal adjustment mechanism.

29. The gimbal mechanism of claim 13, wherein the compressible structure applies a force to the diagonal adjustment mechanism in a direction generally parallel to the lens optical axis, thereby providing a friction force to resist rotation of the diagonal adjustment mechanism.

30. The gimbal mechanism of claim 20, wherein the compressible structure applies a force to the diagonal adjustment mechanism in a direction generally parallel to the lens optical axis, thereby providing a friction force to resist rotation of the diagonal adjustment mechanism.

* * * * *

UNITED STATES PATENT AND TRADEMARK OFFICE
CERTIFICATE OF CORRECTION

| | | |
|---|---|---|
| PATENT NO. | : 7,534,057 B2 | |
| APPLICATION NO. | : 11/295013 | |
| DATED | : May 19, 2009 | |
| INVENTOR(S) | : Theodore L. Jones and Kathleen E. Arnold | |

It is certified that error appears in the above-identified patent and that said Letters Patent is hereby corrected as shown below:

Please add the following claims beginning at column 8, line 50:

-- 31. The gimbal mechanism of claim 27, wherein said pan adjustment mechanism includes a pan axis about which the camera lens assembly rotates, said pan fastener offset from said pan axis.

32. The gimbal mechanism of claim 27, wherein said pan fastener includes means for avoiding localized deformations formed in said pan adjustment mechanism. --

Signed and Sealed this

Seventeenth Day of November, 2009

David J. Kappos
*Director of the United States Patent and Trademark Office*